United States Patent Office 3,006,969
Patented Oct. 31, 1961

3,006,969
ALKYLATED PHENOLS
Kenneth F. Koetitz, Concord, Calif., assignor to Shell Oil Company, a corporation of Delaware
No Drawing. Filed Nov. 13, 1956, Ser. No. 621,523
7 Claims. (Cl. 260—624)

This invention relates to novel processes for the preparation of alkylated phenols. More particularly, it relates to de-etherizing para-ethers of 2,6-dialkyl phenols to produce the corresponding alkyl phenols.

Heretofore, numerous methods and techniques have been described for the preparation of alkylated phenols. The purpose of these numerous teachings has been to achieve more efficient yields of desired products for it invariably happens that in the preparation of alkylated phenols mixed products are produced. This has the disadvantage that additional processing steps are required to separate the mixture of alkylated phenols. Furthermore, it often happens that yields of the desired product are too low. Another disadvantage of prior art methods is that the starting materials usually are para-monoalkylphenols, as cresol. Not only are such starting materials costly but the available supply is limited and uncertain since it is most commonly obtained from petroleum refining processes. Furthermore, the prior art processes for the preparation of the para-alkyl derivatives of 2,6-dialkyl phenols often involve the reaction of para-alkyl phenols with an olefin, such as isobutylene, in the presence of acidic materials. This has the further disadvantage that the olefin is polymerized to a certain extent thus reducing the yield and contaminating the desired product. It is an important advantage of this invention that para-alkylphenols are not used in the processes thus eliminating the necessity for the use of these costly materials and at the same time assuring an abundant supply of starting materials in the form of phenol and olefins. It is an equally important advantage of this invention that polymers are not produced during the process of this invention thus avoiding the waste attendant with prior art methods. By the present invention, it is found that alkylated phenols are prepared by novel processes which are totally unexpected in view of the prior art teaching.

It is an object of this invention to provide novel processes for the preparation of alkylated phenols. More particularly, it is an object of this invention to provide novel processes for the preparation of various 2,4,6-trialkylphenols. It is another object of this invention to provide processes which give high yields of certain alkylated phenols. It is still another object of this invention to produce certain alkylated phenols by processes which are substantially more efficient than prior art processes, thus resulting in substantial savings in the cost of production. Another object of this invention is to provide processes whereby certain alkylated phenols are produced without using para-alkyl phenols as a reactant. Other objects will become apparent as the description proceeds.

These and other objects are accomplished by a process for the preparation of 2,6-dialkyl-p-alkylphenols which comprises treating a 4-alkoxyalkyl-2,6-dialkylphenol with hydrogen at elevated temperatures and pressures in the presence of a hydrogenation catalyst. The reaction may be generically represented by the equation:

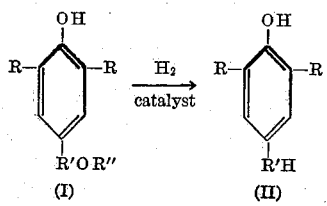

wherein R, R' and R'' are lower alkyl radicals, as will hereinafter appear more fully.

As it regards the novel processes of this invention, the starting material is any 2,6-dialkylphenol. The alkyl radicals, indicated by R in the above formulae, may have up to 8 carbon atoms, or more, and may be prepared by any convenient means. One such means is by the reaction of phenol with about two moles of an olefin in the presence of certain organo-aluminum compounds. The 2,6-dialkylphenols thus produced will have the same number of carbon atoms in the alkyl radical as the particular olefin selected for the reaction. Typical olefins which add to the 2,6-position of phenol as indicated above, include propylene, butylene, isobutylene, pentene-1, pentene-2, hexene-3, octene-4, and the like. Actually, the method used to alkylate phenol in the 2,6-position is immaterial so long as the starting material is blocked in the ortho-positions. By this means, the ether is formed in the 4-position as shown by Formula II. Therefore, in the above formula, the R's may be the same or different alkyl radicals.

Broadly, the processes of this invention comprise reacting a 2,6-dialkylphenol of the type previously described with an aldehyde and certain alcoholic bases to form an ether which may be described as a 4-alkoxyalkyl-2,6-dialkylphenol, shown by Formula I, and thereafter treating said ether with hydrogen to hydrogenolize the benzyl ether. The truly surprising feature of this invention is the finding that the treatment with hydrogen cleaves the ether because it is known that when 2,6-diisopropylphenol and 2,6-ditert-butylphenol are subjected to catalytic hydrogenation 2,6-diisopropylcyclohexanol and 2,6-ditert-butylcyclohexanone, respectively, are produced. Thus, it was to be expected that when the benzyl ether is treated with hydrogen the ring would become saturated. Instead the ring remains unaffected.

In the above-described processes the aldehyde which is used in the formation of the ether is selected from those aldehydes which are acyclic, and saturated. Aldehydes of this type having no more than 8 carbon atoms are preferred since aldehydes having a greater number of carbon atoms are found to react only with considerable difficulty. It is more preferred that the aldehyde have not more than 4 carbon atoms and the most preferred species is formaldehyde as this aldehyde reacts more easily and ultimately gives products which are most useful as antioxidants.

The alcoholic base is prepared from any alcohol having not more than 6 carbon atoms. In actual practice it is preferred that methanol be used as other alcohols are found to produce substantially lower yields. Further, as the alkyl radical of the alcohol is subsequently cleaved in the hydrogenolysis, no practical advantage accrues from using alcohols other than methanol. It will be understood however, that the invention is not limited to methanol and alcohols such as ethanol, propanol, isopropanol, butanol, and the like, may be used although, as indicated above, they are less satisfactory. The basic component of the reaction mixture must be an alkaline metal hydroxide. Such hydroxides include sodium hydroxide, potassium hydroxide, and the like.

As indicated above, upon reacting 2,6-dialkylphenol in the presence of an aldehyde and an alcoholic base, there is formed a benzyl ether which may be represented by the formula in which the R's are the same or different lower alkyl radicals, R' is a methylene or alkylidene radical having from 1 to 8 carbon atoms, and R'' is an alkyl radical derived from the alcohol. In the preferred embodiment the R's have up to 6 carbon atoms and in the most preferred embodiment the R's are tertiary-butyl, R' is methylene, derived from formaldehyde, and R'' is —$CH_3$ derived from methanol.

The conditions of reaction for the preparation of the ether are found to be quite variable but certain preferences are made in order to obtain the most beneficial results. In general, it is undesirable that there be an excess of the starting 2,6-dialkylphenol in relation to the other reactants as such an excess favors the formation of undesirable bisphenols as by-products. Thus, for each mole of the 2,6-dialkylphenol a molar excess of an aldehyde, as 37% aqueous formaldehyde, in the order of 1.05 to 7 moles is used with about 2.5 to 5 moles being preferred. The alcohol and aldehyde are present in excess as it is found that the formation of bisphenols are repressed. On the other hand, it is a disadvantage to use too great an excess of either as the excess must eventually be removed at later stages of the process. The process is fully operable if the alcohol is present in about stoichiometric amount but this is not desirable. As a generalization it may be stated that the alcohol is preferably present in amounts ranging from about 5 to 30 moles with about 7 to 25 moles being more preferred. The quantity of the alkali metal hydroxide may be varied over a wide range but it is required that it be present in an amount at least sufficient to give the reaction mixture a pH greater than 7.0. In the preferred embodiment it is desirable to use sufficient alkali metal hydroxide to bring the reaction mixture to a pH of about 9 to 12. The use of a pH substantially below about 9.0, but greater than 7.0, causes considerably longer reaction times whereas a pH substantially in excess of 12 increases the yield of by-products.

The temperatures used in the preparation of the ether may vary from about 35° C. to about 100° C., and even higher, but temperatures in the order of 40 to 70° C. are preferred. Temperatures which are substantially higher than 100° C. result in reduced yields of the ether and corresponding increases in the amount of by-product. Further, at the higher temperatures, a Cannizzaro reaction may occur with formaldehyde, and similar aldehydes which have no active hydrogen in the alpha-position to the carbonyl group, with the formation of a formic acid salt. The time required for the reaction to be completed will vary depending upon a number of factors such as the ratio of the reactants used, the temperature of the reaction and the pH. The effect of reaction time is generally shown by the Table I where 2 moles of 2,6-ditert-butylphenol, 15 moles of methanol, .66 mole of water and 2.1 moles of formaldehyde, as 37% formalin, was reacted at 40–45° C. with 8 grams of sodium hydroxide.

TABLE I

| Hours reacted | Composition of product, percent m. | | |
|---|---|---|---|
| | Methoxymethyl-2,6-di-tert-butylphenol (ether) | By-product bisphenol [1] | 2,6-di-tert-butylphenol |
| 1 | 26 | 3 | 71 |
| 3 | 50 | 6 | 44 |
| 5 | 63 | 12 | 25 |
| 6.5 | 65 | 16 | 19 |

[1] 4,4'-Methylene bis(2,6-di-tert-butylphenol).

It is an advantage that the ethers are easily formed by merely reacting the several ingredients for the desired period of time. It is still another advantage that the process for the formation of the ether is capable of wide variation. Some variations are found to be extremely beneficial. Thus, for example, if desired paraform may be used with considerable advantage instead of formalin. Where paraform is used, the pH of the reaction mixture must be held sufficiently high in order for it to go into solution. Still other variations will be seen to be advantageous from the following examples which are intended to illustrate how variations affect the yield of the ethers.

*Example I*

To a reaction vessel equipped with an agitator, thermometer, reflux condenser and heating and cooling means are charged 1 mole of 2,6-di-tert-butylphenol, 1.06 moles of formaldehyde as 37% formalin, 7.5 moles of methanol, .66 mole water, excluding the water in the formalin, and sufficient sodium hydroxide to raise the pH to 9.0. The temperature is raised to 45° C. and maintained within the range of 40 to 49° C. for 60 minutes. By flashing the reaction product in a Claisen distillation column at about 140° C. at 4 mm. Hg 26% of 4-methoxymethyl-2,6-di-tert-butylphenol is recovered, which is about a 29% conversion of the phenol. The by-product amounts to about 3 mole-percent of the reaction product. By reacting the same mixture for 6½ hours, 65 mole-percent of the ether is obtained which amounts to an 81 molar conversion of the starting phenol. There is, however, 16 mole-percent of by-product formed.

*Example II*

The procedure of Example I is repeated using 10 moles of methanol and .95 mole of water. After reacting for 2½ hours 0.75 mole of the ether is separated based on an 80% conversion of the starting phenol. The by-product amounts to about 20% of the completed reaction mixture.

*Example III*

The procedure of Example I is repeated except that the reaction is conducted at about 72° C. for 30 minutes. The reaction product contains about 64% of the ether and about 25% of by-product, the remainder being unreacted phenol.

*Example IV*

The procedure of Example I is repeated using 5.0 moles of formaldehyde, as 37% formalin, and 25 moles of 75% methanol. The reaction product contains 74% of the ether and 5% of by-product after reacting for 4 hours at 45–47° C. Reacting for 10 hours gives a reaction product containing 91% of ether and 7% by-product, the balance being unreacted 2,6-di-tert-butylphenol.

*Example V*

To a reaction vessel equipped as in Example I are charged .5 mole of 2,6-di-tert-butylphenol, 2.5 moles of paraform, 12.5 moles of methanol, .05 mole of sodium hydroxide and 68 moles of water. After reacting at 1¼ hours at 70° C. there is obtained a reaction mixture having about 92% 4-methoxymethyl-2,6-di-tert-butylphenol and about 8% by-product. Lesser yields of the ether are obtained using small amounts of paraform with a corresponding increase in the by-product.

*Example VI*

The procedure of Example I is repeated using 2,6-diisopropylphenol, formalin and ethanolic base. The reaction product contains 4-ethoxymethyl-2,6-diisopropylphenol, the by-product 4,4'-methylene bis(2,6-diisopropylphenol) and a considerable amount of the unreacted starting phenol.

*Example VII*

The procedure of Example I is repeated using equimolar amounts of acetaldehyde. The reaction product contains considerably lesser amounts of the ether 4-(1-methoxyethyl)-2,6-di-tert-butylphenol. The bulk of the reaction product is the unreacted phenol.

Example VIII

Using the same procedure described in the above examples, butanol is used in the preparation of the alcoholic base. Considerably lower yields of the corresponding ether are obtained. In other experiments propionaldehyde and n-caproaldehyde are reacted instead of formaldehyde. The corresponding ethers are obtained in considerably smaller amounts.

The separation of the by-product need not be undertaken prior to the hydrogenolysis since the by-product is not ordinarily affected thereby. If desired, however, the reaction product obtained as in the examples may be treated to remove the by-product. This may be accomplished by simple distillation at reduced pressures in the order of 1 to 5 mm., or more, at temperatures ranging from about 100° C. to 175° C. After the etherification is complete, it is most desirable to immediately proceed with the hydrogenolysis step without separating the by-product as it is found that the ether on standing in the alkaline medium slowly reacts with unreacted 2,6-dialkyl-phenol to increase the quantity of the by-product.

The hydrogenolysis may be conducted in a liquid phase using any non-reactive solvent such as lower alcohols, n-alkanes, aromatic hydrocarbons, and the like, or if desired, a solvent need not be used. Hydrogenolysis is found to proceed rapidly at temperatures in the order of 110° C. to 170° C. and pressures in the order of 100 to 700 p.s.i.g., or higher, wherein a substantial portion of the pressure may be due to the partial pressure of the solvent. Still higher pressures may be used without adversely affecting the hydrogenolysis but temperatures in excess of 250° C. should not be used as the alkyl groups in the 2,6-position will be stripped. In one experiment temperatures in the order of 200° C. and pressures about 2000 p.s.i. were used without substantially affecting the yield.

The hydrogenolysis requires the use of a suitable hydrogenation catalyst. Such catalysts are preferably selected from metals of groups I, II and IV through VIII of the periodic table, their alloys and derivatives such as their sulfides, oxides and chromites. Examples include silver, copper, iron, manganese, molybdenum, platinum, chromium, cobalt, rhodium, tungsten, mixtures of metals, such as copper-silver mixtures, copper-chromium mixtures, nickel-cobalt mixtures, and their derivatives such as copper oxide, copper chromite, nickel sulfide, silver sulfide, and the like. Particularly preferred catalysts are the members of the group consisting of nickel, copper, cobalt, iron, chromium, silver and platinum, and their oxides, sulfides and chromites. These catalysts may be employed in a finely divided form and dispersed in and throughout the reaction mixture, or they may be employed in a more massive state, either in essentially the pure state or supported upon or carried by an inert carrier material such as pumice, kieselguhr, diatomaceous earth, clay, alumina, charcoal, carbon or the like, and the reaction mixture contacted therewith as by flowing the mixture over or through a bed of the catalyst or according to other methods known in the art.

The amount of the catalyst employed may vary over a considerable range depending upon the type of catalyst employed, the specific ether, the temperatures and pressures, and the like. In general, the amount of the catalyst ranges from about .1% to 35% by weight of the ether but amounts ranging from about 1% to 15% are more preferred. Depending on the several variables involved, it will be found that the catalyst may be recovered and reused for several batches before it becomes necessary to recharge and/or replace it.

The hydrogenolysis may be conducted in any suitable apparatus of the type that is conventionally employed for hydrogenation processes. Thus, for example, the ether, catalyst and solvent, if desired, are charged to a pressure-resistant vessel equipped with the necessary inlets and outlets, heating means, pressure gauge, thermometer, etc. After the hydrogenolysis is complete the reaction product is separated from the by-product whereupon it is found that the ether has been substantially completely converted to the desired alkylated phenol.

The hydrogenolysis is described in more detail in the following examples.

Example IX

To a hydrogenation vessel equipped with suitable inlets, thermometer, and heating and cooling means is added 150 grams of 4-methoxymethyl-2,6-d-tert-butyl-phenol, 45 grams of copper chromite, and a small amount of methanol. The vessel is pressured with hydrogen to 500 p.s.i.g. and the temperature is raised to and maintained at 130–145° C. After about 30 minutes the hydrogenolysis is complete and the contents of the vessel are removed and separated whereupon it is found that substantially 100% conversion of the ether has taken place to yield 2,6-di-tert-butyl p-cresol.

Example X

The procedure of Example IX is repeated except that the quantity of the catalyst is reduced to 3 grams. Substantially the same result is obtained. The catalyst is recovered and reused in subsequent runs.

Example XI

The ether prepared by the procedure of Example VI is hydrogenolized by the procedure of Example IX to yield 2,6-diisopropyl p-cresol.

Example XII

In the same manner as in Example IX, 4-ethoxymethyl-2,6-di-tert-butylphenol is treated with hydrogen using 3000 p.s.i. of hydrogen pressure. The hydrogenolysis is found to be complete in several minutes. Using the same procedure such ethers as 4-ethoxymethyl-2,6-diisopropyl phenol, 4-(1 - butoxyethyl)2,6 - di - tert - butylphenol, 4-methoxymethyl-2,6-dipentyl phenol and the like, are found to yield the corresponding alkylated phenols.

From the foregoing description it will be apparent that the process of this invention is capable of wide variation without departing from the spirit of this invention. Thus, for example, it will be apparent that the hydrogenolysis will require longer reaction times at lower temperatures and pressures.

I claim as my invention:

1. A process for preparing a 2,6-dialkyl-para-alkyl-phenol from a 2,6-dialkyl-para-alkoxyalkylphenol, which comprises hydrogenolyzing the 2,6-dialkyl-para-alkoxyalkylphenol in the presence of a hydrogenation catalyst at a temperature in excess of about 110° C. but below about 250° C. and a pressure from about 100 p.s.i.g. to about 3000 p.s.i.g.

2. The process of claim 1 wherein the hydrogenation catalyst is copper chromite.

3. A process for preparing 2,6-di-tert-butyl-4-methyl-phenol from 2,6-di-tert-butyl - 4 - methoxymethylphenol, which comprises hydrogenolyzing the 2,6-di-tert-butyl-4-methoxymethylphenol in the presence of a hydrogenation catalyst at a temperature in excess of about 110° C. but below about 250° C. and a pressure from about 100 p.s.i.g. to about 3000 p.s.i.g.

4. A process for preparing a 2,6 - dialkyl - para - alkyl-phenol from a 2,6-dialkyl-para-alkoxyalkylphenol, which comprises hydrogenolyzing the 2,6-dialkyl - para - alkoxyalkylphenol in the presence of a hydrogenation catalyst at a temperature in excess of about 110° C. but below about 250° C. and a pressure from about 100 p.s.i.g. to about 700 p.s.i.g.

5. The process of claim 4 wherein the hydrogenation catalyst is copper chromite.

6. The process of claim 4 wherein the 2,6-dialkyl-para-alkoxyalkylphenol is 2,6-di-tert-butyl - 4 - methoxymethyl-phenol.

7. The process of claim 4 wherein the 2,6-dialkyl-para-alkoxyalkylphenol is 2-methyl-6-tert-butyl-para-methoxymethylphenol.

References Cited in the file of this patent

UNITED STATES PATENTS

| | | |
|---|---|---|
| 2,053,708 | Fife | Sept. 8, 1936 |
| 2,647,102 | Ambelang | July 28, 1953 |
| 2,838,571 | Filbey | June 10, 1958 |

OTHER REFERENCES

Van Duzee et al.: Jour. Amer. Chem. Soc., vol. 57 (January 1935); pages 147–151 (5 pp.).

Gupta et al.: Chem. Abstracts, vol. 36 (1942); col. 5461–61 (1 p.).

Burawoy et al.: Jour. Chem. Soc. (1949), pages 624–26 (3 pages).

Hartung et al.: Organic Reactions, vol. VII (1953), page 295 (1 page).